(12) United States Patent
Wenger (10) Patent No.: US 10,660,273 B2
(45) Date of Patent: May 26, 2020

(54) WINDROW PICKUP HEADER WITH UNITARY TINE RETENTION PLATE

(71) Applicant: CNH Industrial America LLC, New Holland, PA (US)

(72) Inventor: Bradley Wenger, Lancaster, PA (US)

(73) Assignee: CNH Industrial America LLC, New Holland, PA (US)

( * ) Notice: Subject to any disclaimer, the term of this patent is extended or adjusted under 35 U.S.C. 154(b) by 1016 days.

(21) Appl. No.: 14/702,046

(22) Filed: May 1, 2015

(65) Prior Publication Data
US 2016/0316629 A1    Nov. 3, 2016

(51) Int. Cl.
*A01D 43/02* (2006.01)
*A01D 89/00* (2006.01)

(52) U.S. Cl.
CPC ................... *A01D 89/008* (2013.01)

(58) Field of Classification Search
CPC .................................................. A01D 89/008
USPC ....... 56/190, 341, 344, 364, 400.06, 400.12, 56/400.16
See application file for complete search history.

(56) References Cited

U.S. PATENT DOCUMENTS

| | | | |
|---|---|---|---|
| 1,145,963 A | 7/1915 | Bame | |
| 2,504,943 A * | 4/1950 | Zifferer | A01D 7/04 294/50.9 |
| 2,608,045 A | 8/1952 | Keene | |
| 2,691,266 A * | 10/1954 | Meyer | A01D 41/10 56/341 |
| 2,872,772 A * | 2/1959 | Nolt | A01D 89/008 56/364 |
| 2,987,867 A | 6/1961 | Nicholson | |
| 4,463,546 A * | 8/1984 | Day | A01D 89/00 56/190 |
| 6,272,827 B1 * | 8/2001 | Hsu | A01D 7/10 56/400.12 |
| 6,962,041 B1 * | 11/2005 | Taylor | A01D 89/008 56/341 |
| 7,654,069 B1 * | 2/2010 | Dunham | A01D 89/008 56/190 |
| 8,051,634 B2 * | 11/2011 | McIlwain | A01D 41/10 56/190 |

FOREIGN PATENT DOCUMENTS

DE    19707242 A1    8/1998

* cited by examiner

*Primary Examiner* — Thomas B Will
*Assistant Examiner* — Mai T Nguyen
(74) *Attorney, Agent, or Firm* — Peter Zachrias; Patrick Sheldrake (57) ABSTRACT

The subject application provides a windrow pickup header including an improved windrow hold down device. The windrow hold down device includes a channel member extending across a width of a windrow pickup header chassis, a unitary retention plate carried by the channel member, a first plurality of tines secured to the channel member by the unitary retention plate, and a second plurality of tines pivotably secured to the channel member and selectively engageable with the unitary retention plate to place the second plurality of tines in a non-pivoting stowed position. The unitary retention plate combines multiple tine retention functions into a single part thereby reducing materials costs as well as the labor required to assemble the windrow hold down device.

21 Claims, 8 Drawing Sheets

WINDROW PICKUP HEADER WITH UNITARY TINE RETENTION PLATE

BACKGROUND

The subject application relates generally to a header for use with agricultural harvesters. In particular, the subject application relates to an improved windrow pickup header having a unitary retention plate for fixedly supporting a first plurality of crop hold down tines and pivotably supporting a second plurality of crop hold down tines between operative and stowed positions.

Crop cutting apparatuses such as mower headers are used to cut plants including, but not limited to, hay, grasses, small grains and the like. The cutter device of the mower header feeds the cut crop into a crop conditioner such as a roll conditioner or a flail conditioner. After being conditioned the crop is propelled out of the back of the mower and onto the ground. Adjustable shielding in the back of the mower allows the operator to lay the cut crop in a swath such that it covers the ground like a carpet or mat or in a windrow whereby crop lays in a row. The manner in which crop is laid on the ground (mat or windrow) depends on whether the crop needs to be dried more and/or how it is to be picked up and packaged.

After the mower header has laid the cut crop as a mat or windrow on the ground, another header, commonly referred to as a windrow pickup header, is used to gather the cut crop and deliver it to a combine or similar agricultural device for further processing. A typical windrow pickup header includes a frame or chassis that is connectable to the combine. The chassis has a fore end, an aft end and first and second lateral ends. One or more endless belts carried by the chassis rotate from the fore end to the aft end of the chassis and includes a plurality of fingers that lift the cut crop from the mat or windrow and delivers it to an auger or other conveyor that in turn delivers the crop to a feederhouse opening in a rear wall of the windrow pickup header. Upon passing through the feederhouse opening the crop enters the combine where it undergoes further processing.

The windrow pickup header also includes a windrow hold down device for applying downward force on the cut crop as it is lifted and moved by the belt fingers. The windrow hold down device typically includes a plurality of "standard" tines which are fixedly connected to a mounting bar or channel member disposed at the fore end of the windrow header between first and second lateral ends thereof. The plurality of standard tines extends from the fore end toward the aft end of the header. In addition, the windrow hold down device includes another plurality of "floating" or "short crop" tines that are pivotably connected to the mounting bar or channel member and also extend from the fore end toward the aft end of the header. The standard and floating tines apply pressure to the windrow or mat to keep the crop engaged with the endless belt(s) as the crop is conveyed to the rear of the chassis. The windrow hold down device can be adjusted upwardly or downwardly to decrease or increase pressure on the crop, typically by means of at least one hydraulic cylinder carried by the chassis and connected to the windrow hold down device.

The crop mat or windrow can range from very thick and heavy to very thin and light. When the crop mat or windrow is light the floating tines should be in an operative position in contact with the crop to help keep the crop engaged with the endless belt(s). When the crop mat or windrow is heavy the floating tines should be secured into a stowed position since they are not needed to keep the crop engaged with the endless belt(s).

In conventional windrow hold down devices multiple parts are required to secure the standard and floating tines to the mounting bar and to secure the floating tines in the stowed position. More particularly, each of the standard tines requires a separate mounting part and the floating tines each require an individual limiter/storage feature or part which must be moved individually and manually in order to secure the floating tines in the stowed position.

BRIEF SUMMARY

In accordance with a first aspect, the subject application provides a windrow pickup header including a chassis for connecting to an agricultural harvester. The chassis includes a fore end, an aft end and first and second lateral ends. The header further includes a mounting bar extending between the first and second lateral ends for mounting a first plurality of tines and a second plurality of tines thereon, and a unitary retention plate mounted to the mounting bar fixedly securing the first plurality of tines to the mounting bar. The second plurality of tines are pivotably mounted to the mounting bar and selectively engageable with the unitary retention plate to retain each of the second plurality of tines individually in a stowed position.

In accordance with a second aspect, the subject application provides a windrow hold down device for a windrow pickup header including a channel member for extending across a width of a windrow pickup header chassis and a unitary retention plate carried by the channel member. A first plurality of tines is secured to the channel member by the unitary retention plate and a second plurality of tines is pivotably secured to the channel member and selectively engageable with the unitary retention plate to place the second plurality of tines in a non-pivoting stowed position.

In accordance with a third aspect, the subject application provides a method of assembling a first plurality of tines and a second plurality of tines to a windrow pickup header. The method comprises the acts of pivotably attaching the second plurality of tines to a mounting bar of the windrow pickup header and mounting a unitary retention plate to the mounting bar. One of the mounting bar and the unitary retention plate includes a plurality of recesses for receiving a portion of an individual tine of the first plurality of tines. The method further includes placing each of the first plurality of tines into a respective plurality of recesses and securing the unitary retention plate to the mounting bar to fixedly secure the first plurality of tines to the mounting bar.

In accordance with a fourth aspect, the subject application provides a windrow hold down device of uncomplicated design which effectively retains first and second pluralities of tines and enables the second plurality of tines to be quickly and easily disposed into a stowed position. A unitary retention plate retains the first plurality of tines in fixed position and enables selective stowage of each of the second plurality of tines, thereby incorporating the functions of three parts into a single part. The result is a considerable savings in terms of the number of components and complexity in stowing the second plurality of tines.

The present disclosure engenders an agricultural header having tine retention parts with limiting and storage capabilities for secondary tines. The header has multiple tine retention parts that also incorporates a limiter and storage feature for secondary short crop tines. This header addresses the issue of needing multiple parts to retain standard tines as well as parts to limit and store secondary short crop tines. This provides cost reduction from both a hardware/assembly labor standpoint, as well as the overall costs of having multiple parts, and addressing complexity and assembly issues. The header instead of retaining each standard tine individually and putting a limiter/storage feature individually on each secondary tine, all three are incorporated into a single part. This single part retains the standard tines, limits movement capabilities of the secondary short crop tines, and provides a storage feature for locking up the secondary tines if un-needed in certain crop conditions.

BRIEF DESCRIPTION OF THE SEVERAL VIEWS OF THE DRAWINGS

The foregoing summary, as well as the following detailed description of several aspects of the subject application, will be better understood when read in conjunction with the appended drawings. For the purpose of illustrating the subject application there are shown in the drawings several aspects, but it should be understood that the subject application is not limited to the precise arrangements and instrumentalities shown.

In the drawings.

DETAILED DESCRIPTION

Reference will now be made in detail to the various aspects of the subject application illustrated in the accompanying drawings. Wherever possible, the same or like reference numbers will be used throughout the drawings to refer to the same or like features. It should be noted that the drawings are in simplified form and are not drawn to precise scale. In reference to the disclosure herein, for purposes of convenience and clarity only, directional terms such as top, bottom, left, right, above, below and diagonal, are used with respect to the accompanying drawings. Such directional terms used in conjunction with the following description of the drawings should not be construed to limit the scope of the subject application in any manner not explicitly set forth. Additionally, the term "a," as used in the specification, means "at least one." The terminology includes the words above specifically mentioned, derivatives thereof, and words of similar import.

Referring now to the drawings, wherein aspects of the subject application are shown, FIGS. 1-7 illustrate several features of a windrow pickup header 10 according to the subject application.

Figure 1:
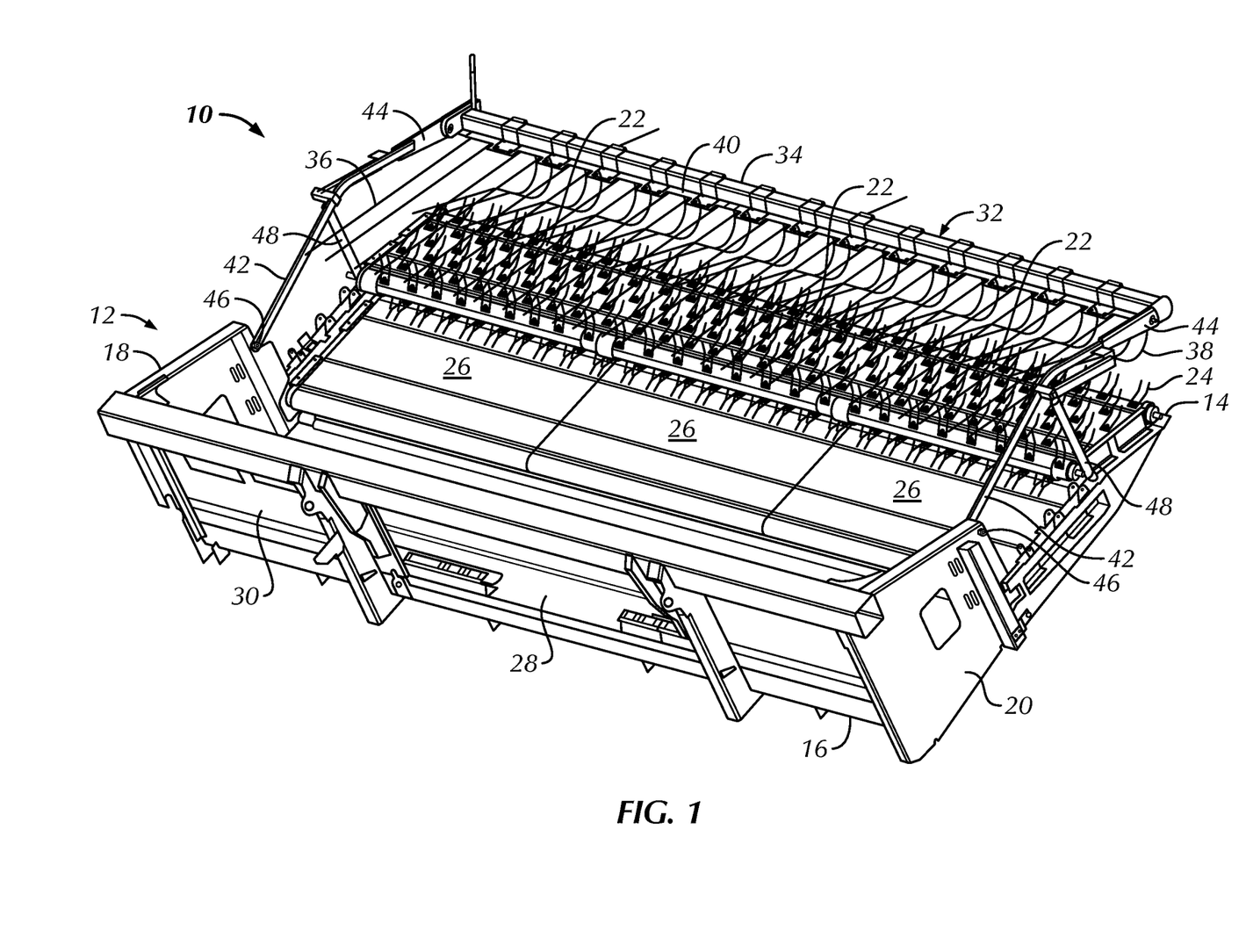
FIG. 1 is a rear perspective view of a windrow pickup header according to an aspect of the subject application.

In FIG. 1 there is shown a rear perspective view of the windrow pickup header 10 which can be attached to a combine or similar agricultural harvester (not shown). Windrow pickup header 10 generally includes a chassis 12 having a fore end 14, an aft end 16 and first and second lateral ends 18 and 20. One or more endless belts 22 carried by the chassis rotate in a direction from the fore end to the aft end of the chassis and include a plurality of fingers 24 that lift the cut crop from the mat or windrow. The endless belts 22 deliver the cut crop via the fingers 24 to a second set of fingerless belts 26 which also rotate in a direction from the fore end to the aft end of the chassis. The fingerless belts 26 in turn deliver the cut crop to an auger or other conveyor (not shown) that conveys the crop to a feederhouse opening 28 in a rear wall 30 of the windrow pickup header from which it is delivered to the combine for further processing.

Figure 2:
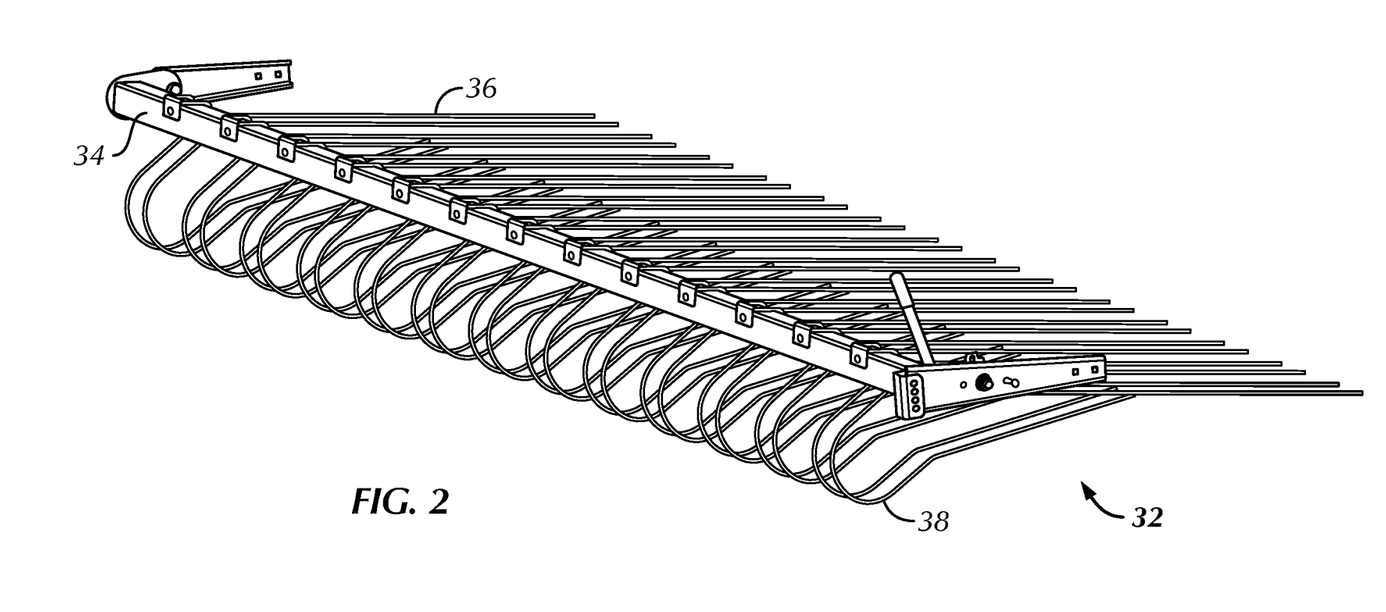
FIG. 2 is a front perspective view of a windrow hold down device of the windrow pickup header of FIG. 1.

Windrow pickup header 10 further includes a windrow hold down device 32 carried about the fore end 14 of chassis 12. Windrow hold down device 32 includes a mounting bar or channel member 34 extending across a width of the windrow pickup header chassis 12 between the first and second lateral ends 18, 20 thereof. As shown in FIGS. 1 and 2, the mounting bar 34 has mounted thereon a first plurality of "standard" tines 36 and a second plurality of "floating" or "short crop" tines 38. As described in greater detail below, the first plurality of tines 36 are fixedly mounted to the mounting bar by a unitary retention plate 40 and the second plurality of tines 38 are pivotably mounted to the mounting bar and selectively engageable with the unitary retention plate to retain each of the second plurality of tines individually in a stowed position.

The phrase "selectively engageable" as used herein pertains to an operator's ability to engage the second plurality of tines with tine receiving structure 72, discussed below, carried by the unitary retention plate 40, as well as the operator's ability to release the second plurality of tines from engagement with the tine receiving structure. That is, it pertains to the ability of the second plurality of tines to be positioned between stowed and operative positions depending on a user's selection in view of the nature of the mat or crop that is to be conveyed by the windrow pickup header 10, or alternatively expressed, to select the whether or not the second plurality of tines is engaged with unitary retention plate.

FIG. 1 further illustrates that the windrow hold down device 32 is connected to chassis 12 by a pair of pivoting arms 42. The arms 42 are located adjacent the lateral ends 18, 20 of the chassis 12 and the fore ends of the arms are fixedly attached to a pair of brackets 44 which support the mounting bar 34. The aft ends of the pair of arms 42 are pivotably connected to chassis 12 at pivots 46. The windrow hold down device 32 can be adjusted upwardly or downwardly to decrease or increase pressure on the crop material that is conveyed by belt(s) 22. In particular, extendable and retractable actuators 48 such as hydraulic cylinders or the like are connected at lower ends thereof to the chassis and at upper ends thereof to the arms 42 whereby extension of the actuators lifts the windrow hold down device to decrease pressure on the moving crop and retraction of the actuators lowers the hold down device to increase pressure on the moving crop.

Figure 3:
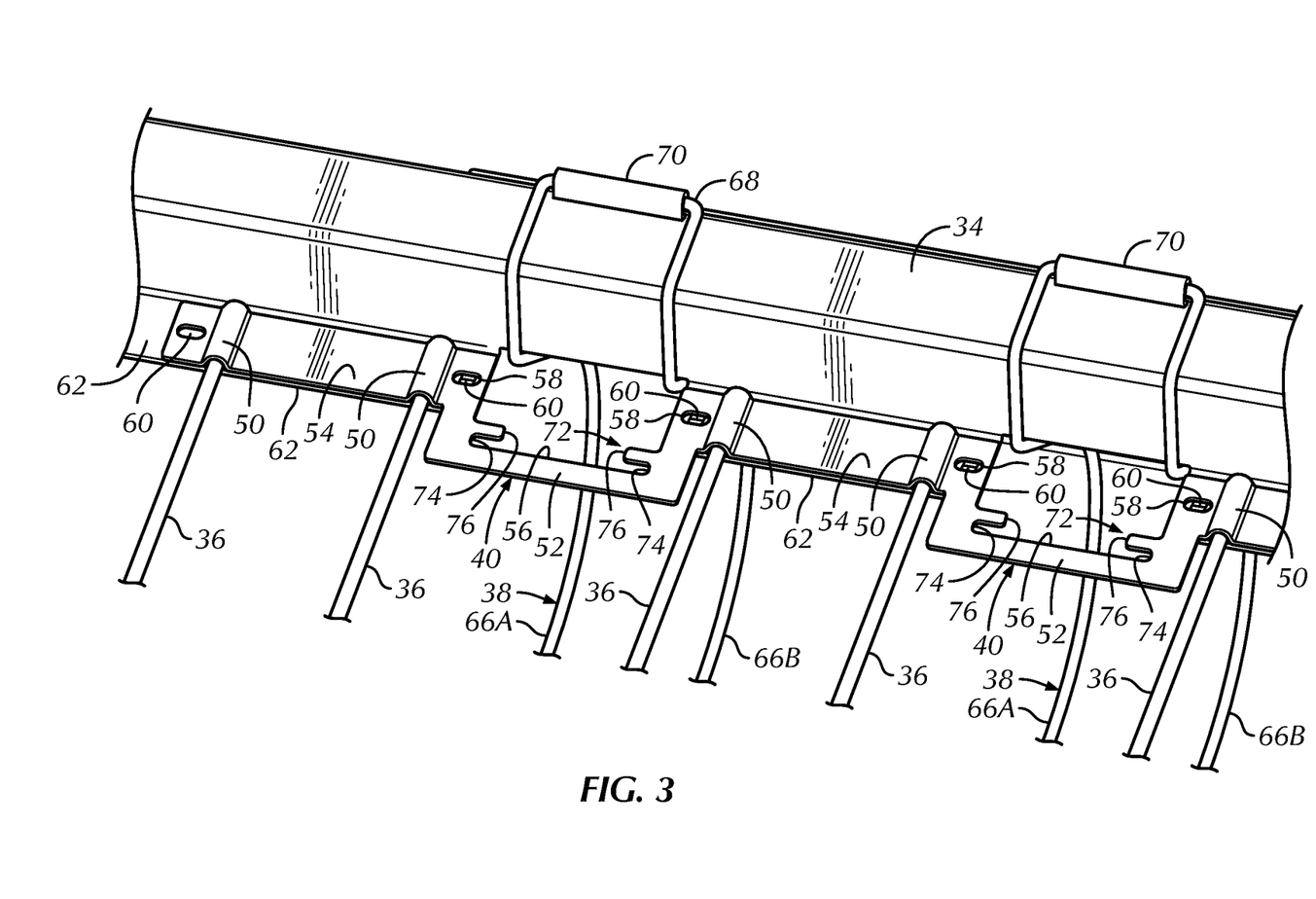
FIG. 3 is an enlarged rear perspective view of a portion of the windrow hold down device of FIG. 2, with a second plurality of tines disposed in an operative position.

Referring to FIG. 3, there is shown an enlarged view of the connections of the first and second pluralities of tines 36, 38 to the mounting bar or channel member 34 as well as the structure of the unitary retention plate 40. One of the mounting bar and the unitary retention plate includes a plurality of recesses for receiving a portion of individual tines of the first plurality of tines. As shown in FIG. 3, the recesses 50 for receiving the first plurality of tines 36 may be provided in the unitary retention plate 40. Alternatively, recesses for receiving the first plurality of tines can be formed on the mounting bar, or via a combination of recesses on both the mounting bar and the unitary retention plate.

According to an aspect, the unitary retention plate is square wave-shaped having maximum position sections 52 and minimum position sections 54. The minimum position sections 54 mount to the mounting bar fixedly securing the first plurality of tines 36 to the mounting bar and the maximum position sections 52 are spaced from the mounting bar to define openings or recesses 56 between the unitary retention plate and the mounting bar for receiving the second plurality of tines 38 therethrough. That is, the second plurality of tines is positioned within a respective recess or opening of the plurality of recesses or openings 56.

FIG. 3 further shows that the minimum position sections 54 include mounting apertures 58 that align with corresponding apertures 60 provided in spaced apart flange portions 62 connected to and extending rearwardly from the mounting bar 34. The aligned apertures 58, 60 receive fasteners 64 such as nuts and bolts, rivets, or the like (FIGS. 4 and 5) for securing the unitary retention plate to the mounting bar at flange portions 62 and clamping the first plurality of tines 36 to the mounting bar.

Figure 3A:
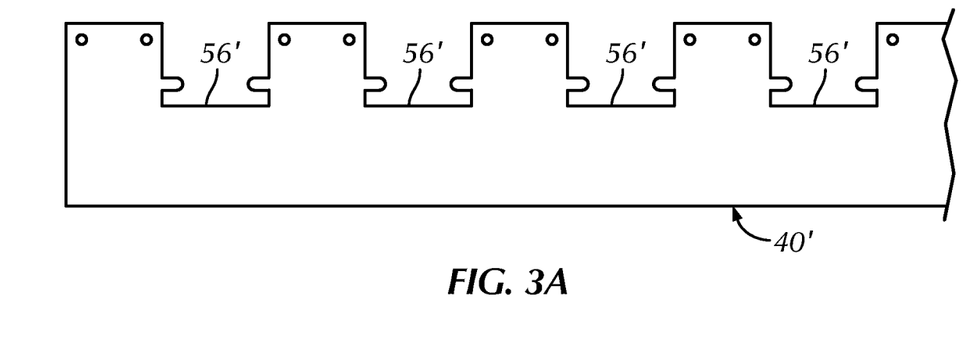
FIG. 3A is a top plan view of a portion of an alternative construction of a unitary retention plate suitable for use in the windrow hold down device of FIG. 2.

In accordance with another aspect, the unitary retention plate can be configured as shown in FIG. 3A. More specifically, FIG. 3A shows a portion of a unitary retention plate 40' in the form an elongate rectangular plate having a plurality of recesses, openings or notches 56' that are operable to receive the second plurality of tines. It will be understood that any other unitary retention plate variations are possible so long as they include structure for securing the unitary retention plate to the mounting bar as well as recesses or notches similar to recesses or openings 56, 56' for receiving the second plurality of tines.

Figure 4:
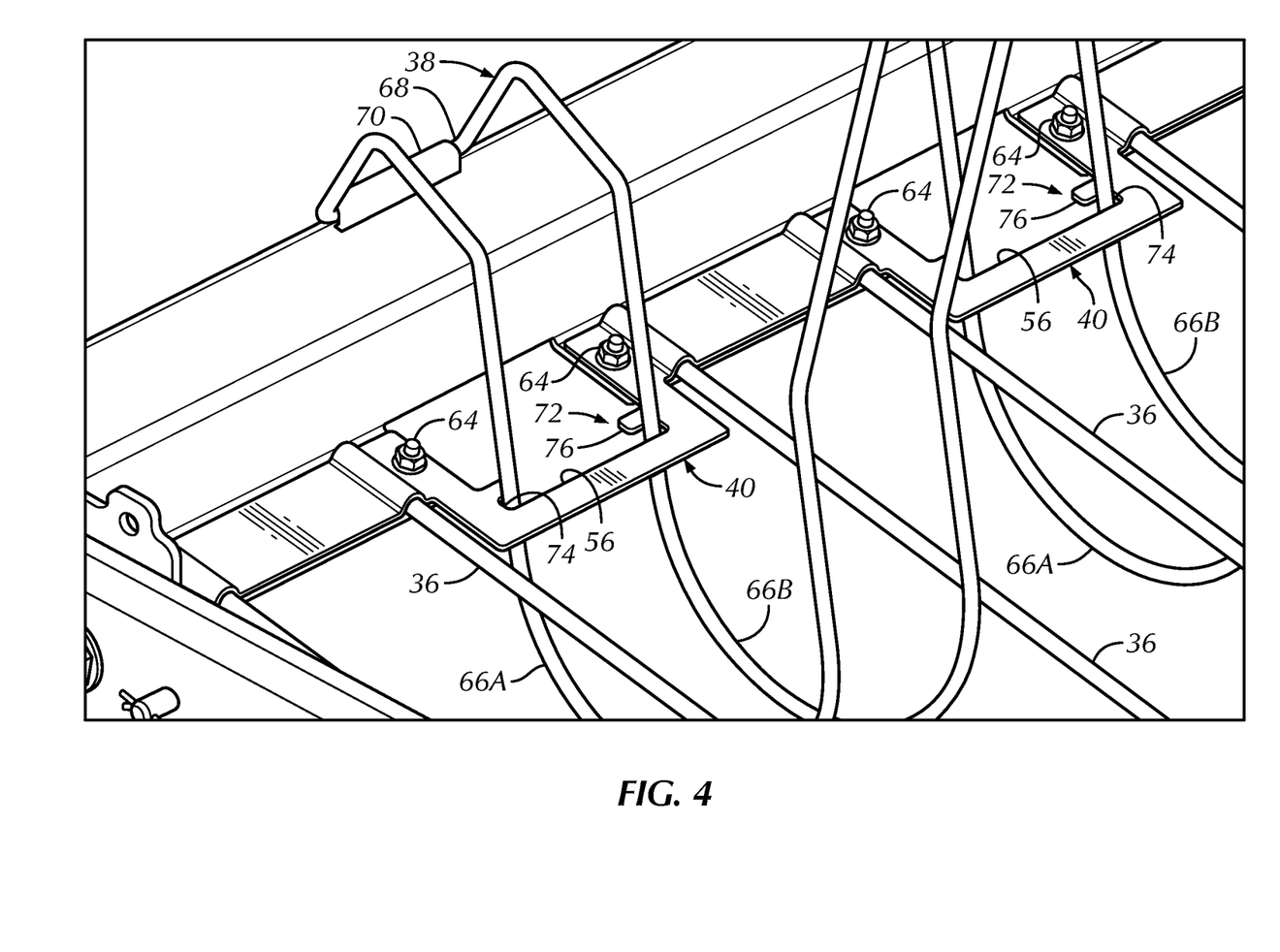
FIG. 4 is an enlarged rear perspective view of a portion of the windrow hold down device of FIG. 2, with a second plurality of tines disposed in a stowed position.
Figure 5:
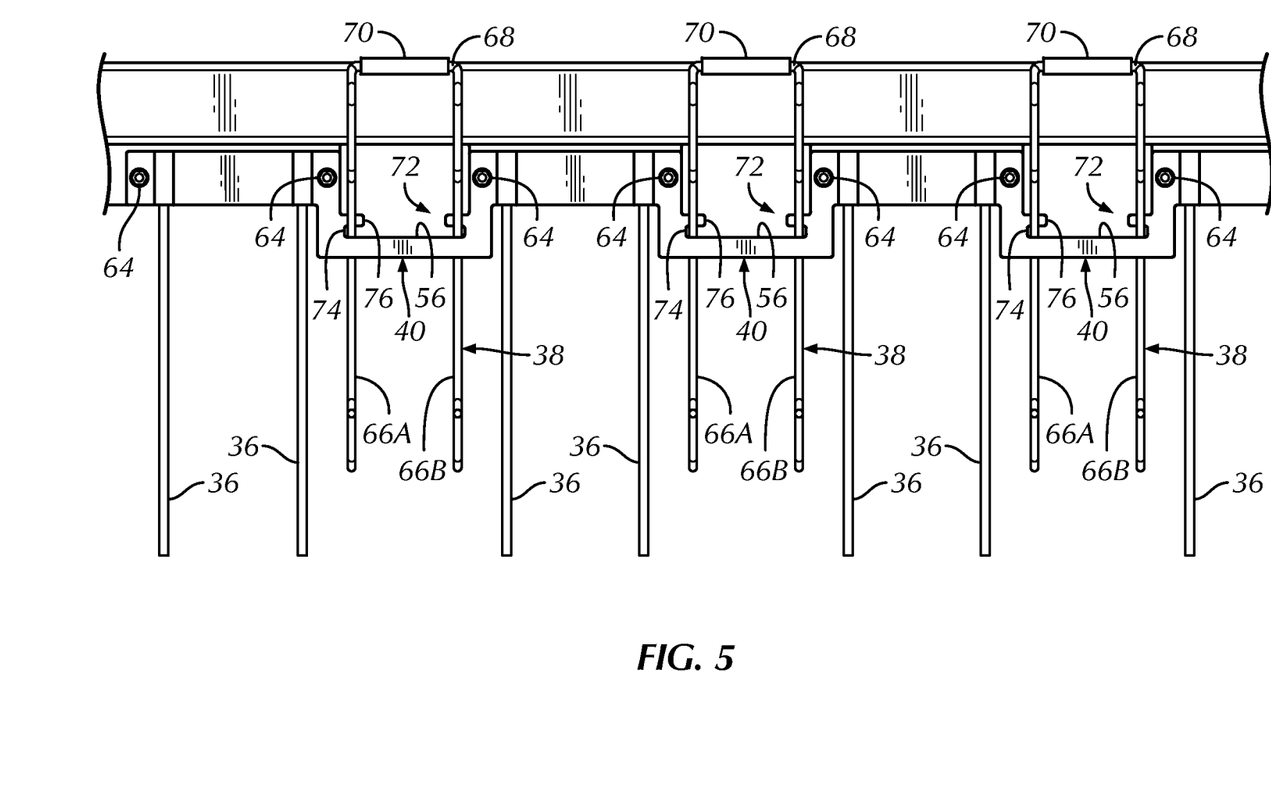
FIG. 5 is an enlarged top plan view of a portion of the windrow hold down device of FIG. 2, with a second plurality of tines disposed in a stowed position.

According to an aspect and as shown in FIGS. 3-5, the second plurality of tines 38 includes a plurality of tine pairs having spaced apart tines 66A, 66B joined by a cross member 68. The tine pairs can be of unitary construction. That is, the tines 66A, 66B and cross member 68 are formed from a single piece of rod-like material which is bent or otherwise formed to assume the shape shown in FIGS. 2-6. The spaced apart tines 66A, 66B are flexible e.g., laterally flexible, relative to the cross member 68 whereby the spaced apart tines may engage with tine receiving structure 72 provided in the unitary retention plate as further discussed below. Further, each of the second plurality of tines is rotatably mounted to the mounting bar 34 by a mounting or bearing plate 70 which rotatably receives cross member 68 and is bolted or otherwise affixed to the mounting bar.

As shown in FIGS. 3-5, the unitary retention plate 40 includes tine receiving structure 72 provided in each opening 56 for selectively engaging individual tines of the second plurality of tines 38. The tine receiving structure 72 comprises a recess 74 for receiving a respective tine. In another aspect, the tine receiving structure comprises a tab 76 which is engageable with an individual tine 66A, 66B of the second plurality of tines for selectively engaging and retaining the tine pair in the stowed position e.g., a non-pivoting stowed position, shown in FIGS. 4-6.

According to a further aspect, the subject application provides a method of assembling the first plurality of tines 36 and the second plurality of tines 38 to the windrow pickup header 10. The second plurality of tines 38 is pivotally attached to the mounting bar 34 via the mounting or bearing plates 70. The unitary retention plate 40 is then mounted to the mounting bar 34, wherein one of the mounting bar and the unitary retention plate includes the plurality of recesses 50 for receiving a portion of an individual tine of the first plurality of tines. As the unitary retention plate is being mounted to the mounting bar, each of the first plurality of tines is placed into the respective plurality of recesses 50. Thereafter, the unitary retention plate is secured to the mounting bar by fasteners 64 to fixedly secure the first plurality of tines to the mounting bar. In addition, the method further includes the act of selectively engaging, at appropriate times, each of the second plurality of tines to the tine receiving structure 72 on the unitary retention plate to place each of the second plurality of tines into a stowed position. More particularly, the act of selectively engaging each of the second plurality of tines comprises flexing an individual second plurality of tines to allow positioning of the individual second plurality of tines to the tine receiving structure. The act of flexing involves bending the tine pair of an individual second plurality of tines toward one another, moving the tine pair into a position whereby they may engage the tine receiving structure and then releasing the tine pair into engagement with the tine receiving structure.

The apparatus and method described hereinabove represents an improvement over existing windrow pickup header and windrow hold down device designs. By virtue of its unique structure, the unitary retention plate 40 integrates into a single component the functionalities of what was previously required by three separate parts. That is, the unitary retention plate effectively fixedly secures the first plurality of tines 36 to the mounting bar 34 while also permitting selective engagement of the tine pairs of the second plurality of tines 38 into a stowed position when it is appropriate to do so. The result is a design which is less complicated and labor-intensive to assemble as well as less expensive due to the elimination of multiple separate tine retention and stowage parts.

Figure 6:
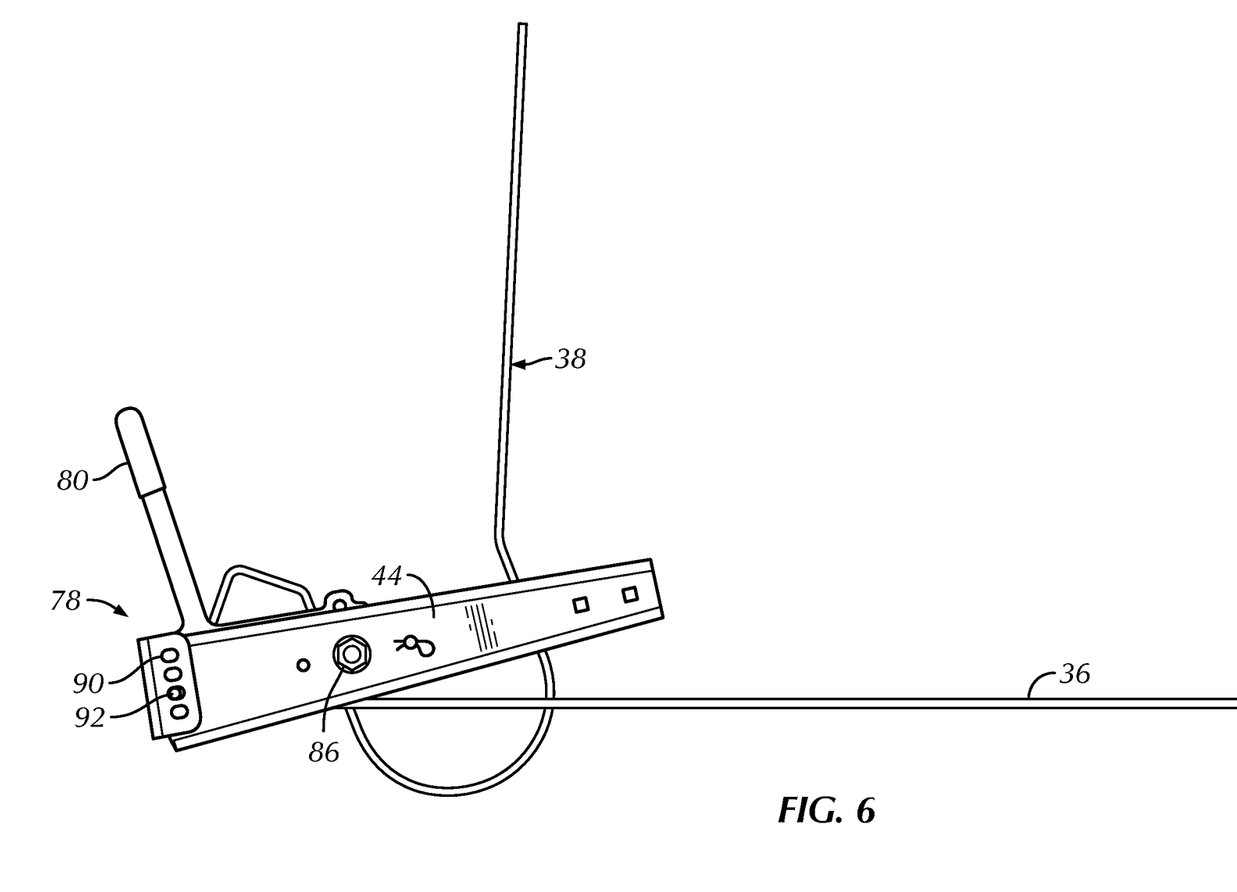
FIG. 6 is a side elevation view of the windrow hold down device of FIG. 2, with a second plurality of tines disposed in a stowed position.
Figure 7:
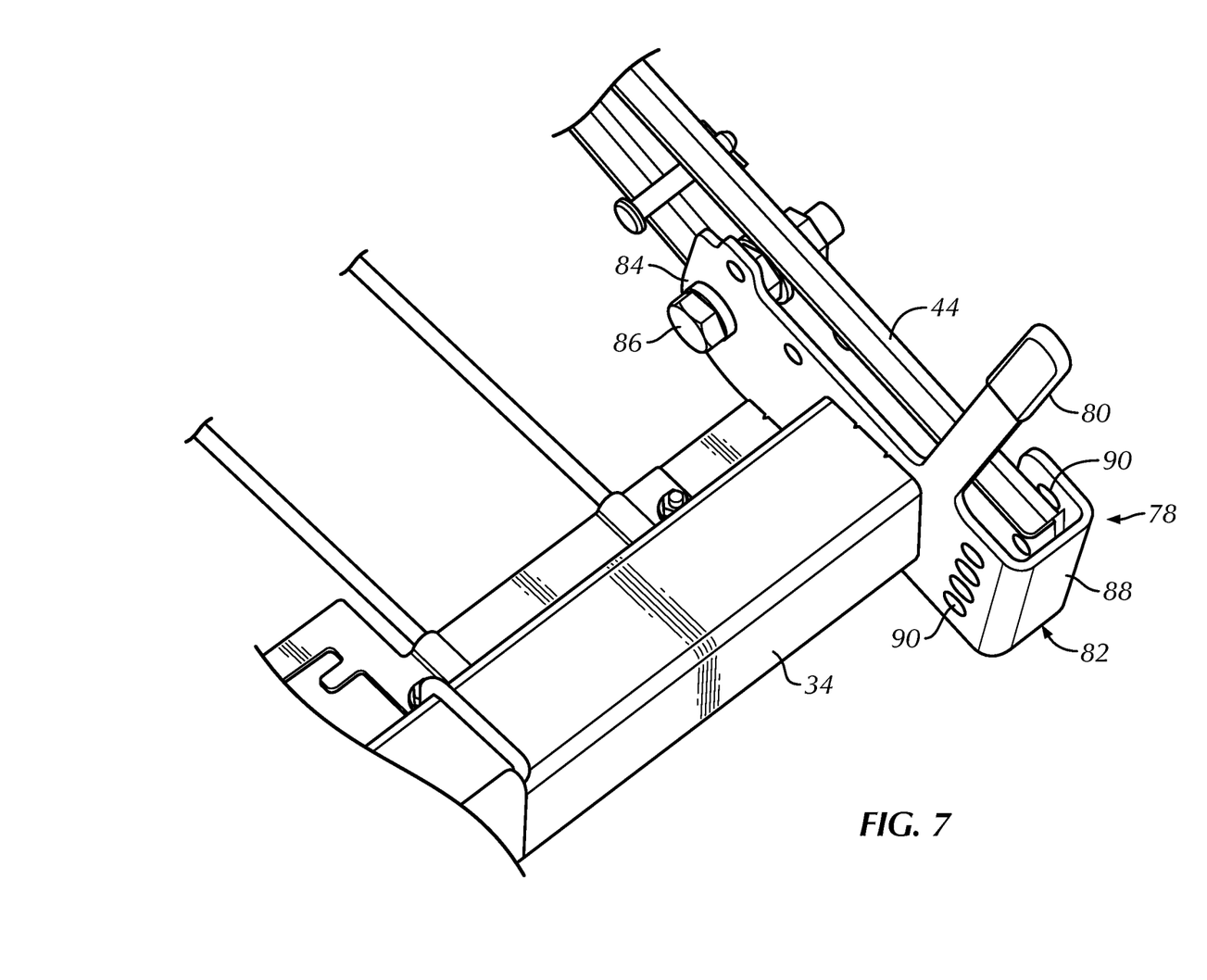
FIG. 7 an enlarged partial perspective view of a mechanism for adjusting an angle at which the first and second plurality of tines contact moving crop being conveyed by the windrow pickup header.

FIGS. 6 and 7 illustrate a mechanism 78 for adjusting the operative angle at which the first and second pluralities of tines engage a windrow or mat of cut crop material being conveyed by the windrow pickup header. According to an aspect, the tine angle adjustment mechanism 78 includes an upwardly extending handle 80 provided at one lateral end of the windrow hold down device that can be moved into selected positions to place the mounting bar and the tines carried thereby into a desired angle of attack. The handle 80 is part of an adjustment member 82 to which the mounting bar 34 (FIG. 7) is fixedly attached such as by welding, bolting, or the like. Adjustment member 82 has an aft end 84 which is pivotably connected to bracket 44 via a bolt 86 which passes through the adjustment member and the bracket and a U-shaped fore end 88. The fore end 88 of adjustment member is provided with opposed sets of aligned apertures 90 which are adapted to align with an aperture 92 (FIG. 6) provided in bracket 44 and receive an unillustrated fixation pin in order to secure the adjustment member and thus the mounting bar and tines carried thereby in a desired angular position with respect to the moving crop.

In order to adjust the angle of attack of the mounting bar, an operator first removes the fixation pin from the aligned apertures 90 and 92. Thereafter, the user grasps handle 80 and moves the handle forwardly or rearwardly thereby pivoting adjustment member 82 about pivot bolt 86 to bring another set of apertures 90 into alignment with aperture 92. Once the desired apertures 90 are in alignment with aperture 92, the operator inserts the fixation pin into the aligned apertures in order to retain the adjustment member 82 at the newly selected angular position.

It will be appreciated by those skilled in the art that changes could be made to the various aspects described above without departing from the broad inventive concept thereof. It is to be understood, therefore, that the subject application is not limited to the particular aspects disclosed, but it is intended to cover modifications within the spirit and scope of the subject application as defined by the appended claims.

What is claimed is:

1. A windrow pickup header comprising:
   a chassis for connecting to an agricultural harvester, the chassis including a fore end, an aft, end and first and second lateral ends;
   a mounting bar extending between the first and second lateral ends for mounting a first plurality of tines and a second plurality of tines thereon; and
   a unitary retention plate mounted to the mounting bar fixedly securing the first plurality of tines to the mounting bar, wherein the unitary retention plate is square wave-shaped having maximum position sections and minimum position sections, and wherein the minimum position sections mount to the mounting bar fixedly securing the first plurality of tines to the mounting bar and the maximum position sections are spaced from the mounting bar defining an opening between the unitary retention plate and the mounting bar for receiving the second plurality of tines therethrough, and
   wherein the second plurality of tines are pivotably mounted to the mounting bar and selectively engageable with the unitary retention plate to retain each of the second plurality of tines individually in a stowed position.

2. The windrow pickup header of claim 1, wherein one of the mounting bar and the unitary retention plate includes a plurality of recesses for receiving a portion of an individual tine of the first plurality of tines.

3. The windrow pickup header of claim 1, wherein the second plurality of tines comprises a plurality of tine pairs having spaced apart tines joined by a cross member, and wherein the spaced apart tines are flexible relative to the cross member.

4. The windrow pickup header of claim 1, wherein the unitary retention plate includes a plurality of recesses and each of the second plurality of tines is positioned within a respective recess of the plurality of recesses.

5. The windrow pickup header of claim 1, wherein the unitary retention plate includes a tine receiving structure for selectively engaging an individual second plurality of tines in the stowed position.

6. The windrow pickup header of claim 5, wherein the tine receiving structure comprises a recess.

7. The windrow pickup header of claim 5, wherein the tine receiving structure comprises a tab engageable with an individual second plurality of tines for selectively engaging the individual tine pair in the stowed position.

8. The windrow pickup header of claim 5, wherein the second plurality of tines comprises a plurality of tine pairs having spaced apart tines joined by a cross member, and wherein each of the plurality of tine pairs is laterally flexible for selectively engaging the tine receiving structure to retain the tine pair in the stowed position.

9. A windrow pickup header comprising:
   a channel member extending across a width of a windrow pickup header chassis;
   a unitary retention plate carried by the channel member;
   a first plurality of tines non-pivotably secured to the channel member by the unitary retention plate; and
   a second plurality of tines pivotably secured to the channel member and selectively engageable with the unitary retention plate to place the second plurality of tines in a non-pivoting stowed position,
   wherein the unitary retention plate includes maximum position sections and minimum position sections, and wherein the minimum position sections mount to the channel member non-pivotably securing the first plurality of tines to the channel member and the maximum position sections are spaced from the channel member defining an opening between the unitary retention plate and the channel member for receiving the second plurality of tines therein.

10. The windrow pickup header of claim 9, wherein one of the channel member and the unitary retention plate includes a plurality of tubular recesses, and wherein each of the plurality of tubular recesses receives a respective first plurality of tines.

11. The windrow pickup header of claim 9, wherein the unitary retention plate includes a plurality of recesses and each of the second plurality of tines is positioned within a respective recess of the plurality of recesses.

12. The windrow pickup header of claim 9, wherein the unitary retention plate is square wave-shaped.

13. The windrow pickup header of claim 9, wherein the second plurality of tines comprises a plurality of tine pairs having spaced apart tines joined by a cross member, and wherein the spaced apart tines are flexible relative to the cross member.

14. The windrow pickup header of claim 9, wherein the unitary retention plate includes a tine receiving structure for selectively engaging an individual second plurality of tines in the stowed position.

15. The windrow pickup header of claim 14, wherein the tine receiving structure comprises a recess.

16. The windrow pickup header of claim 14, wherein the second plurality of tines comprises a plurality of tine pairs having spaced apart tines joined by a cross member, and wherein each of the plurality of tine pairs is laterally flexible for selectively engaging the tine receiving structure to retain the tine pair in the stowed position.

17. The windrow pickup header of claim 14, wherein the tine receiving structure comprises a tab engageable with the individual second plurality of tines for selectively engaging in the stowed position.

18. A windrow pickup header comprising:
   a chassis for connecting to an agricultural harvester, the chassis including a fore end and an aft end;
   a mounting bar extending widthwise across the chassis;
   a unitary retention plate mounted to the mounting bar;
   a first plurality of linear tines mounted to an aft portion of the mounting bar; and
   a second plurality of non-linear tines pivotably mounted to a fore portion of the mounting bar, wherein the second plurality of non-linear tines includes a linear portion and a non-linear portion, and wherein the second plurality of non-linear tines are selectively engageable with the unitary retention plate to retain each of the second plurality of non-linear tines in a stowed position.

19. The windrow pickup header of claim 18, wherein each of the first plurality of linear tines includes a fore end and an aft end opposite the fore end, and the fore end is attached to unitary retention plate.

20. The windrow pickup header of claim 18, wherein each of the first plurality of linear tines is mounted to the unitary retention plate and extends away from the unitary retention plate.

21. The windrow pickup header of claim 18, wherein each of first plurality of linear tines includes a fore end and an aft end and is completely linear from its fore end to its aft end.

* * * * *